United States Patent
Henocq et al.

(10) Patent No.: US 8,605,785 B2
(45) Date of Patent: Dec. 10, 2013

(54) METHOD AND DEVICE FOR VIDEO DATA TRANSMISSION

(75) Inventors: Xavier Henocq, Melesse (FR); Fabrice Le Leannec, Mouaze (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 655 days.

(21) Appl. No.: 12/477,008

(22) Filed: Jun. 2, 2009

(65) Prior Publication Data

US 2009/0296821 A1 Dec. 3, 2009

(30) Foreign Application Priority Data

Jun. 3, 2008 (FR) ...................................... 08 53670

(51) Int. Cl.
*H04N 7/12* (2006.01)

(52) U.S. Cl.
USPC ............. 375/240.16; 375/240.13; 375/240.27

(58) Field of Classification Search
USPC ........................... 375/240.16, 240.13, 240.27
See application file for complete search history.

(56) References Cited

U.S. PATENT DOCUMENTS

| | | | | |
|---|---|---|---|---|
| 6,233,283 | B1 | 5/2001 | Chiu et al. | 375/240.27 |
| 6,937,769 | B2 | 8/2005 | Onno | 382/233 |
| 7,010,037 | B2 | 3/2006 | Ye et al. | 375/240.1 |
| 7,415,068 | B2 * | 8/2008 | Francois et al. | 375/240.16 |
| 7,518,537 | B2 * | 4/2009 | Sekiguchi et al. | 341/107 |
| 7,881,258 | B2 * | 2/2011 | Gilbert et al. | 370/329 |
| 2002/0071485 | A1 * | 6/2002 | Caglar et al. | 375/240.01 |
| 2003/0138047 | A1 | 7/2003 | Orchard et al. | 375/240.13 |
| 2004/0179598 | A1 | 9/2004 | Zhou et al. | 375/240.11 |
| 2005/0024487 | A1 * | 2/2005 | Chen | 348/14.13 |
| 2005/0117640 | A1 * | 6/2005 | Han | 375/240.03 |
| 2007/0009039 | A1 * | 1/2007 | Ryu | 375/240.16 |
| 2008/0144725 | A1 * | 6/2008 | Henocq et al. | 375/240.27 |
| 2008/0247469 | A1 * | 10/2008 | Vadapalli et al. | 375/240.27 |
| 2009/0138773 | A1 | 5/2009 | Henocq et al. | 714/746 |
| 2009/0220004 | A1 * | 9/2009 | Cieplinski et al. | 375/240.16 |
| 2009/0232200 | A1 | 9/2009 | Henocq et al. | 375/240.01 |
| 2010/0239015 | A1 * | 9/2010 | Wang et al. | 375/240.16 |

FOREIGN PATENT DOCUMENTS

WO 2005/029867 3/2005

OTHER PUBLICATIONS

H. Schwarz, et al., "Overview of the Scalable Video Coding Extension of the H.264/AVC Standard", IEEE Transactions on Circuits and Systems for Video Technology, vol. 17, No. 9, pp. 1103-1120, Sep. 2007.

(Continued)

*Primary Examiner* — Christopher S Kelley
*Assistant Examiner* — Maria Vazquez Colon
(74) *Attorney, Agent, or Firm* — Fitzpatrick, Cella, Harper & Scinto (57) ABSTRACT

For transmitting a sequence of video images on a network between a server and a client, that sequence being coded according to a hybrid predictive coding mode and comprising a plurality of images, each image being broken down into a plurality of macroblocks of pixels: the plurality of macroblocks is classified (E212) into at least two groups of macroblocks according to a predetermined criterion; these groups of macroblocks are completed (E216, E226) by additional macroblocks; at least two scalable coding levels are created (E214, E224) from these groups of macroblocks; unequal protection against transmission errors is applied (E218) to the groups of macroblocks based on the predetermined criterion; and the scalable coding levels are transmitted (E220) on the network.

16 Claims, 7 Drawing Sheets (56) References Cited

OTHER PUBLICATIONS

T. Wiegand, et. al., "Joint draft ITU-T Rec. H.264 ISO/IEC 14496-10/Amd. 3 Scalable Video Coding", 24th JVT meeting, Geneva, Switzerland, pp. 1-559, Jul. 2007.

French Preliminary Search Report, dated Jan. 21, 2009, in corresponding French Application No. FR 0853670.

U.S. Appl. No. 12/595,953, filed Oct. 14, 2009, Inventors: Xavier Henocq, Patrice Onno and Fabrice Le Leannec.

* cited by examiner

METHOD AND DEVICE FOR VIDEO DATA TRANSMISSION

TECHNICAL FIELD

The present invention relates to a method and device for video data transmission.

It belongs to the general field of packet video transmission on a network between a server and a client.

BACKGROUND OF THE INVENTION

The transport protocol used in such a network may for example be the Real-time Transport Protocol (RTP), well known to a person skilled in the art.

An unreliable network is considered, i.e. one that guarantees neither stability of the transmission conditions, nor the reliable transmission of packets. In other words, loss of packets may occur.

The present invention seeks to protect data against errors, including the loss of packets. It lies within the non-limiting scope where the data are video data that comply with the H.264/AVC standard or SVC (Scalable Video Coding) standard. Nevertheless, the adaptation of the invention to other video coding standards such as MPEG-4 part 2, H.263 and other scalable video coding standards presents no difficulties.

A few basic notions concerning the H.264 and SVC standards now follow.

The SVC standard constitutes an extension of the H.264 standard in that it introduces scalable coding or scalability properties.

The H.264 standard constitutes the state of the art in terms of video compression. It enables compression efficiency to be considerably increased compared to MPEG-2, MPEG-4 part 2 and H.263. In terms of technology, the H.264 standard is based on a traditional hybrid predictive coding pattern using a combination of spatial transformation and motion compensation/estimation, this general pattern being optimized to obtained better compression efficiency.

Several coding modes are available for coding a macroblock of pixels (henceforth referred to as MB), which include:
  INTRA or I: INTRA coding is a spatial coding. The MB is independent of any other information coming from other images.
  INTER or P: INTER MBs are the result of a temporal prediction on the basis of a previously coded image. This type of MB is coded in the form of a motion vector and residual data.
  Bidirectional or Bidir or B: B MBs use the same principle as P MBs in that they also result from a temporal prediction. However, for B MBs, two reference regions are extracted from a previous image and from a subsequent image respectively, which are used for the prediction. This type of MB is therefore coded in the form of two motion vectors and residual data.
  P_SKIP: for P_SKIP MBs, no other data is coded in the binary stream except the MB type. The final motion vector of a P_SKIP MB is deduced from the surrounding coded MBs.
  B_SKIP, B_direct_16×16 and B_direct_8×8: no motion information is transmitted with such MBs. The information is deduced from the surrounding MBs which were coded previously or from the motion vector of the MB located in the same position in the next reference image. Furthermore, no residual data are coded with B_SKIP MBs.

During the coding process, an MB mode selection mechanism is implemented. When the INTRA mode is selected for an MB, the INTRA prediction consists in predicting this MB in the field of pixels by using the pixels located along the outer boundary of this MB. A DCT is then applied to the difference between the prediction and the original and this difference is coded.

Such predictive coding is also applied to the motion vector. In fact, a motion vector in a temporally-predicted MB is coded in a predictive manner by using motion vectors of surrounding MBs. Consequently, the absolute value of a motion vector is not coded but replaced by MvdI0 and MvdI1 which represent the difference between a vector component to be used and its prediction.

Each MB is associated with a parameter called Coded_block_pattern specifying which of the 6 8×8 blocks (luminance and chrominance) may contain non-null transformation coefficient levels.

The SVC standard has added to H.264 possibilities of adaptation in the form of scalable coding or scalability properties. Three scalability axes have been defined in SVC: spatial, temporal and quality.

Temporal scalability allows the temporal resolution of a sequence to be modified by suppressing certain images, such suppression taking dependencies between images into account.

Spatial scalability consists in inserting several resolutions in a video stream, the lowest resolution being used to predict the highest resolutions. A particular feature of SVC is that it allows any ratio of resolutions between two successive spatial resolutions whereas a ratio of only 2 was allowed by previous scalable codecs.

Quality scalability, also know by the name of SNR scalability, takes the form of Coarse Grain Scalability (CGS), Medium Grain Scalability (MGS) and Fine Grain Scalability (FGS).

CGS SNR coding is achieved by using the same concepts as those of spatial scalability. The only difference is that for CGS scalability, the oversampling operations of the inter-layer prediction are omitted.

FGS results in a binary stream that can be truncated at any point, without preventing the decoding process. This characteristic is of particular interest for adapting the binary stream of the video in a precise manner.

MGS scalability has been defined as intermediate between CGS and FGS. It offers finer decoding points in the binary stream than CGS, but does not allow truncation at any point like FGS. Many coding and network experts believe that MGS offers sufficient granularity for practical network conditions.

Scalability is based on an Inter-Layer Prediction (ILP). Several coding modes have been specially designed for inter-layer prediction in SVC:
  IntraBL or I_BL: this mode allows a MB to be predicted in an enhancement layer depending on the MB located in the same position in the lower layer. The MB of the lower layer is interpolated in order to re-scale it to the resolution of the enhancement layer. The difference between the MB to be coded and the interpolated MB located in the same position is then coded.
  Prediction of the motion vectors: in this mode, the MB of the enhancement layer is deemed to have a motion close to that of the MB of the lower layer. In this case, at the very most a slight variation of the motion vector of the MB of the lower layer is coded in the enhancement layer.
  Residual prediction: in this mode, an MB in an enhancement layer that has a motion close to the MB located in the same position in the lower layer is deemed also to have similar residual data. Consequently, the difference between the residual data is coded.

The MBs of an enhancement layer using data from a lower layer for their coding are identified by a flag called base_mode_flag. If it has a value 1, this flag indicates that the MB prediction mode as well as the corresponding motion data are deduced from the base layer. A second flag called residual_prediction_flag indicates that the residual data of the MB in question are predicted by using the data of the lower layer.

It will be noted that with H.264 and SVC, the transmission of a video on a network is facilitated, with the notion of the Network Abstraction Layer (NAL). A NAL is a sort of container that provides in its header a brief description of the data transported on the network.

A great deal of research has been carried out on error control in the field of video transmission on unreliable networks.

One solution, called INTRA Refresh, consists in coding the important MBs in INTRA mode. Given that INTRA MBs are not subject to error propagation, this allows the quality of the video in difficult conditions to be improved.

However, the main drawback of this solution is linked to the cost of coding the INTRA MB. In fact, the gain in robustness involves an increase in the video bandwidth. Furthermore, this solution is not really adapted to pre-coded videos.

Another solution lies in limiting the number of reference images. For example, in a Group of Pictures (GOP), only one image is used as a reference for temporal prediction for all of the other images in the GOP. Better protection is therefore provided for this image than for the others.

Nevertheless, knowing that just one image is used as a reference in a GOP for temporal prediction, the compression performance of the coder decreases, because it benefits less from temporal correlations.

The partitioning of data is another notion that allows better protection of important data. An example of using data partitioning is proposed in patent document U.S. Pat. No. 7,010,037.

In that document, a scalable coder or a transcoder uses data partitioning to create two scalable layers from a raw or pre-coded video. It uses the conventional functionality of data partitioning as defined in MPEG-4 Part 2, which consists in separating into two binary streams the motion vectors, the low-frequency DCT coefficients (DC) and the AC coefficients that are the most important among the other AC coefficients.

The idea is to optimize the partitioning of the coefficients for each block without increasing the cost due to coding the partitioning point.

The process described in U.S. Pat. No. 7,010,037 has various drawbacks. In particular, it requires the use of a non-standard decoder, because additional information is required by the decoder to identify the way in which the coefficients have been partitioned. Furthermore, as partitioning depends on the bandwidth available, new partitioning must be defined if network conditions change.

SUMMARY OF THE INVENTION

The aim of the present invention is to overcome the drawbacks of the prior art by proposing Unequal Error Protection (UEP), depending on the importance of the data, and by not requiring the decoder to be modified.

With this aim in mind, the present invention provides a method for the transmission of a sequence of video images on a network between a server and a client, the sequence being coded according to a hybrid predictive coding mode and comprising a plurality of images, each image being broken down into a plurality of macroblocks of pixels, the method being remarkable in that:

the plurality of macroblocks is classified into at least two groups of macroblocks according to a predetermined criterion;

these groups of macroblocks are completed by additional macroblocks;

at least two scalable coding levels are created from these groups of macroblocks;

unequal protection against transmission errors is applied to the groups of macroblocks based on the predetermined criterion; and the scalable coding levels are transmitted on the network.

Thus, the invention allows unequal error protection to be applied to the macroblocks depending, for example, on their importance. By separating data regarded as important from data regarded as of low importance into two bitstreams, protection can be more easily targeted.

Furthermore, transcoding is very simple when the two levels of scalability are CGS layers.

Moreover, the method is adaptive, because the classification of a MB as "important" or "less important" may be adjusted depending on the quality that the server wishes to offer the client or depending on throughput constraints.

Furthermore, the video stream can still be decoded by any standard decoder that complies with the standard adopted for coding, for example SVC.

In addition, it is not necessary to modify the video data if the network conditions change: in fact, the video stream may be modified off-line and the error correction level may be adjusted to suit the network conditions encountered at the time of transmission.

In one particular embodiment, the predetermined criterion defines the importance of a macroblock depending on an estimation of the quality obtained by the client in the event of the macroblock being lost during transmission.

This allows the quality perceived by the client to be better taken into account.

According to a particular characteristic, quality estimation uses a simulation of error masking for the lost macroblock.

The error masking capacities of the clients are thus taken into account. In this way, a MB that is lost, but can still be effectively recovered by masking, will be deemed to be of low importance.

According to a particular characteristic, the quality estimation involves determining the sum of the absolute values of the differences between the original version and the masked version of the lost macroblock and the classification step involves comparing this sum to a predetermined limit value, above which the macroblock is deemed to be important.

According to a particular characteristic, the additional macroblocks are macroblocks located in the same position as the macroblocks deemed to be important, in another of the at least two scalable coding levels created from the above-mentioned groups of macroblocks.

Additional MBs allow a video stream compatible with the SVC standard to be kept.

According to a particular characteristic, the error protection application step consists in applying a Reed-Solomon coding at least to the macroblocks deemed to be important.

According to a particular characteristic, the method also involves steps according to which the additional macroblocks are coded differently depending on the type of coding of the macroblocks of the above-mentioned groups of macroblocks.

According to a particular characteristic, the method also involves steps according to which, if the type of coding of a macroblock of the above-mentioned groups of macroblocks is INTRA:
- it is checked whether the derivation of the motion vector of the INTRA macroblock from the surrounding coded macroblocks produces a null vector;
- if this is the case, an additional macroblock is coded with a P_SKIP type coding;
- otherwise, an additional macroblock is coded with an INTRA type coding and a parameter indicating the absence of a non-null coefficient is added.

According to a particular characteristic, if the type of coding of a macroblock of the above-mentioned groups of macroblocks is not INTRA:
- it is checked whether the derivation of the motion vector of the non-INTRA macroblock from the surrounding coded macroblocks produces a null difference of motion vectors;
- if this is the case, an additional macroblock with a P-SKIP or B_SKIP type coding is coded;
- otherwise, an additional macroblock is coded with a type P or B coding and a parameter indicating the absence of a non-null coefficient is added.

According to a particular characteristic, scalable coding complies with the SVC (Scalable Video Coding) standard.

This allows a normalized bitstream to be obtained, which guarantees interoperability between different pieces of equipment originating from different manufacturers.

With the same aim as that indicated above, the present invention also provides a device for the transmission of a sequence of video images on a network between a server and a client, the sequence being coded according to a hybrid predictive coding mode and comprising a plurality of images, each image being broken down into a plurality of macroblocks of pixels, the device being remarkable in that it comprises:
- a module to classify a plurality of macroblocks in at least two groups of macroblocks according to a predetermined criterion;
- a module for completing these groups of macroblocks by additional macroblocks;
- a module for creating at least two scalable coding levels from these groups of macroblocks;
- a module for applying an unequal protection against transmission errors to the groups of macroblocks according to the predetermined criterion; and
- a module for transmitting the scalable coding levels on the network.

Still with the same aim, the present invention also covers a telecommunications system comprising a plurality of terminal devices connected through a telecommunication network, remarkable in that it comprises at least one terminal device equipped with a transmission device such as that briefly described above.

Still with the same aim, the present invention also covers a means of storing information readable by a computer or microprocessor storing instructions of a computer programme, remarkable in that it allows a transmission method such as that briefly described above to be implemented.

Still with the same aim, the present invention also covers a computer programme product that can be loaded onto a programmable apparatus, remarkable in that it comprises sequences of instructions to implement a transmission method such as that briefly described above, when this programme is loaded and executed by the programmable apparatus.

Since the particular characteristics and advantages of the transmission device, telecommunications system, information storage means and computer programme product are similar to those of the transmission method, they are not repeated here.

BRIEF DESCRIPTION OF THE DRAWINGS

Further features and advantages of the invention will emerge from the following detailed description of particular embodiments, given by way of non-limiting examples. The description refers to the accompanying drawings, in which.

DETAILED DESCRIPTION OF PARTICULAR EMBODIMENTS

The solution proposed by the present invention is based on a classification of the macroblocks (MBs) as a function of a criterion of importance of the data that they contain.

Once this classification has been made, the binary stream corresponding to an important MB is used to build a first SVC CGS layer.

The less important MBs are used to create a second CGS layer.

Error correction is then applied to the first CGS layer only, which produces the UEP effect, i.e. unequal error protection. In a general manner, stronger error protection is applied to the first layer, which contains the more important macroblocks according to the importance criterion.

It will be noted that the two CGS layers could in fact be decoded but the decoding of the base layer will not provide a video of acceptable quality, because it contains only part of the MBs.

The importance criterion is defined here as the capacity of a MB to be recovered with an acceptable quality by error masking from the client's side if it has been lost during the transmission from the server to the client.

Figure 5:
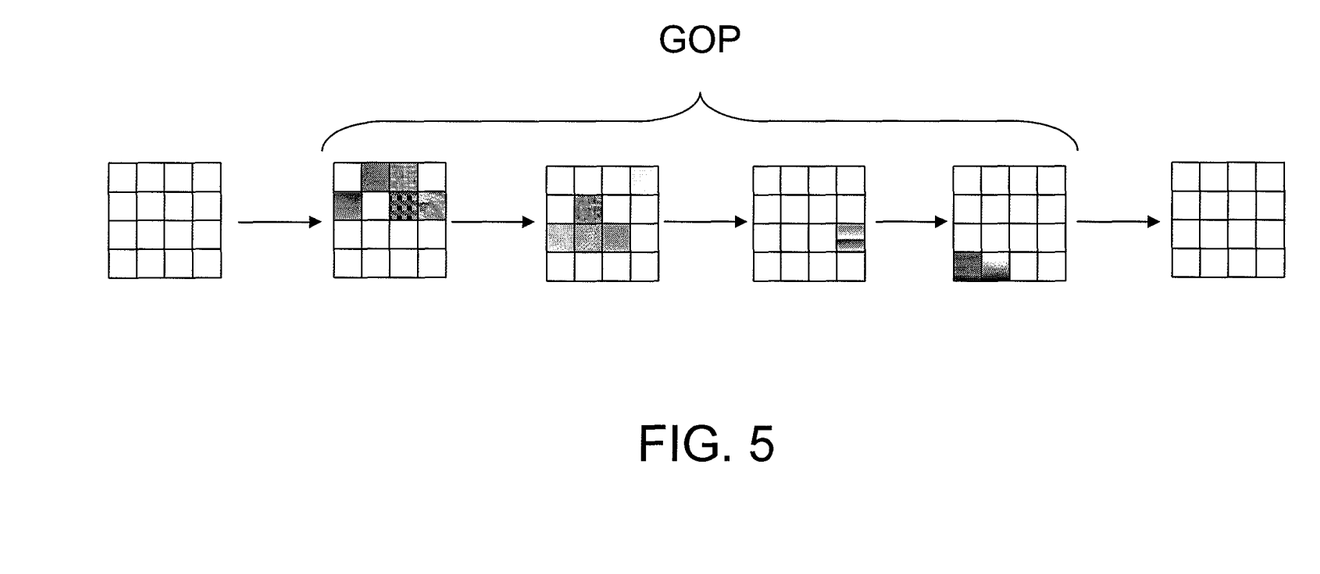
FIG. 5 illustrates an example of a GOP containing important MBs, dispersed within said GOP.
Figure 6:
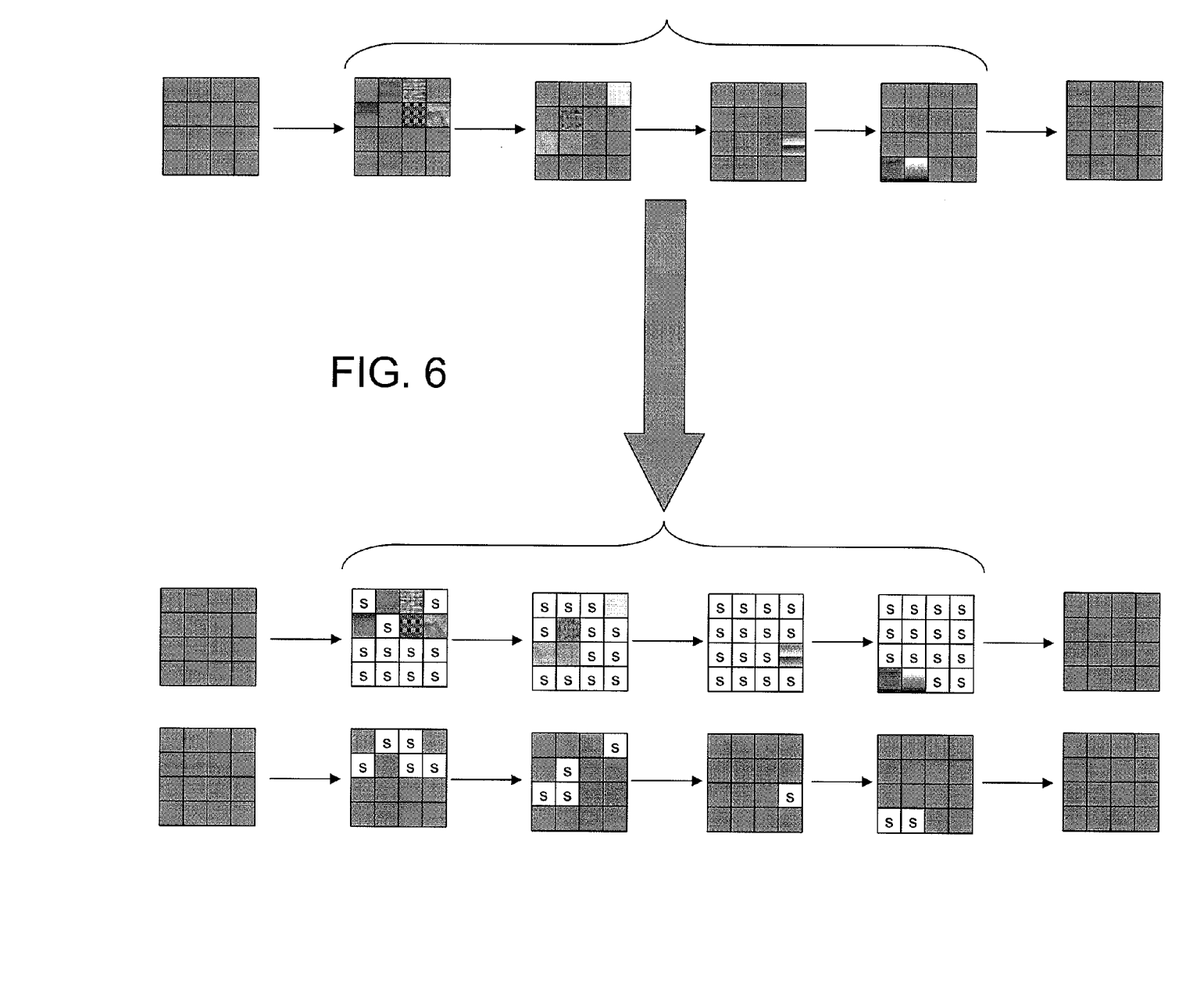
FIG. 6 illustrates, for the GOP of FIG. 5, the generation of two CGS layers, one of which receives the important MBs and the other, the less important MBs.
Figure 7:
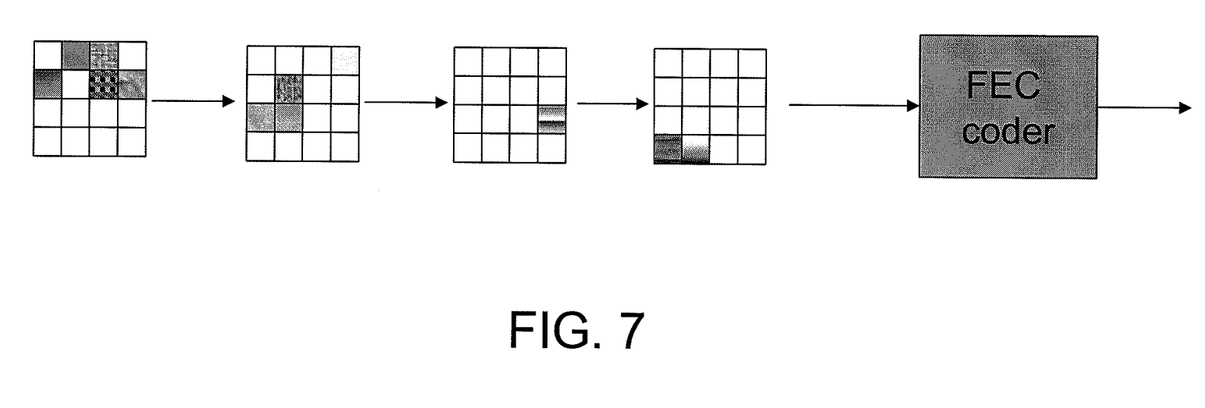
FIG. 7 illustrates, for the GOP of FIG. 5, the application of the error correction to only one of the two CGS layers created.

The general concept of the invention is illustrated in FIGS. 5, 6 and 7.

FIG. 5 illustrates a group of pictures or GOP extracted from an H.264 binary stream or from a stream corresponding to a SVC spatial layer. In this GOP, the MBs corresponding to important MBs are shown with a texture.

FIG. 6 shows that two CGS layers are created. A first CGS layer (here an enhancement CGS layer) receives the more important MBs. A second CGS layer (here a base CGS layer) receives the less important MBs. The missing MBs in each layer are replaced by "skipped" MBs, such a skipped MB not corresponding exactly to the definition of a skipped MB in the standard. Even if they are standard, most of the information that they contain is deduced from other MBs.

As FIG. 7 shows, a Frame Error Correction (FEC) coder is applied to the binary stream corresponding solely to the first CGS layer.

Figure 1:
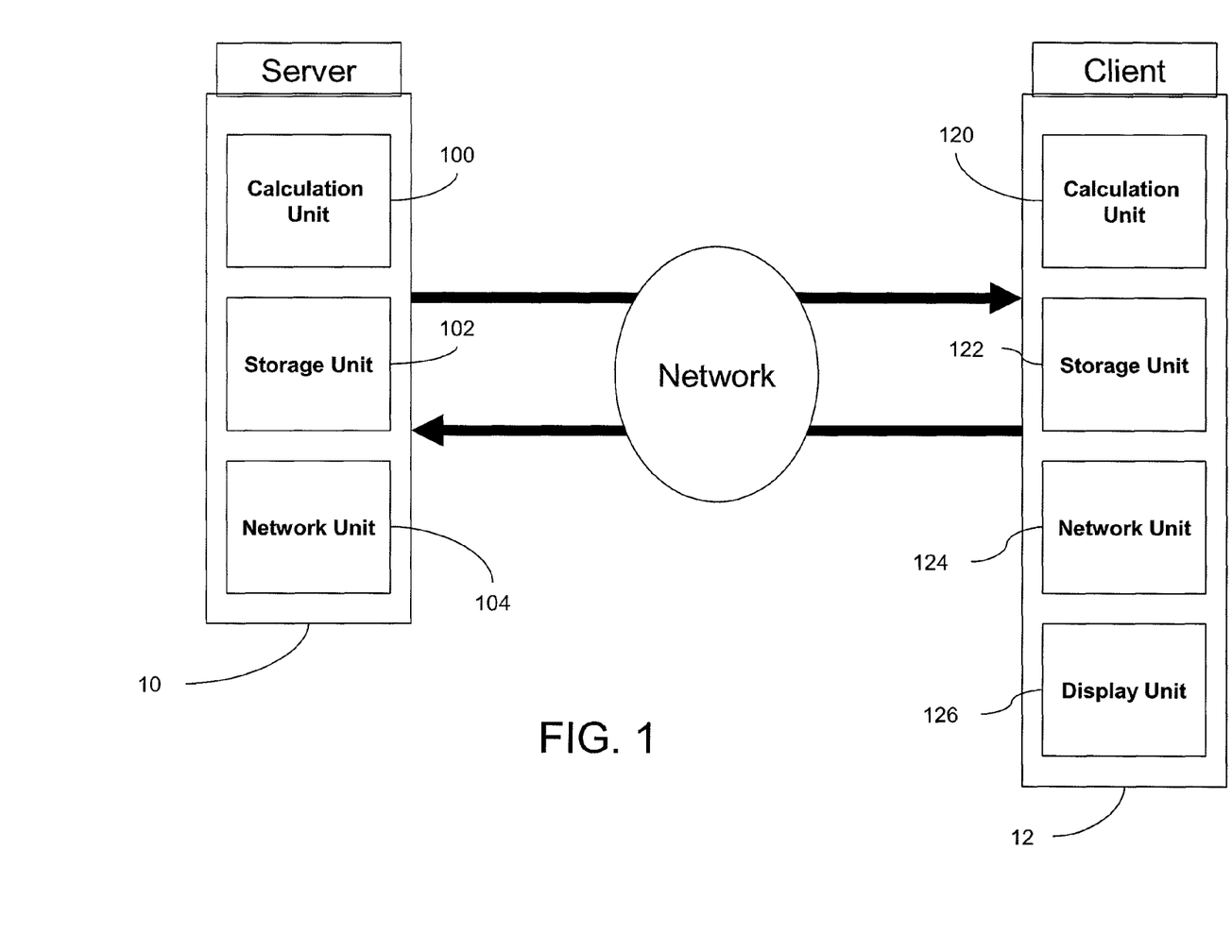
FIG. 1 schematically represents a video transmission system capable of implementing the present invention, in one particular embodiment.

As shown in FIG. 1, a transmission system capable of implementing the present invention consists of a server 10 and a client 12 which communicate through a communication network. The system illustrated in FIG. 1 may comprise all or part of the means of implementation of a transmission method according to the present invention.

The server 10 comprises a storage unit 102 memorizing a coded video as well as the programmes required to implement the invention. The server may also comprise a temporary storage means reader such as a disk reader to co-operate with a disk.

The server 10 also comprises a calculation unit 100 capable of executing programmes and a network unit 104 capable of transmitting the video data on the network.

As a variation, the methods of processing the digital signal may be stored in different storage locations. Generally speaking, an information storage means that can be read by a computer or by a microprocessor, built in or not built into the server 10, possibly removable, may memorize one or more programmes the execution of which implements the transmission method according to the present invention.

An image acquisition unit such as a digital camera or scanner may be added to take videos directly, the calculation unit 100 undertaking the compression of the video.

The particular embodiment chosen for the invention may be developed, for example by adding updated or improved processing methods; in such a case, these new methods can be transmitted to the server 10 by the communication network, or loaded onto the server 10 by means of one or more disks. Clearly, the disks may be replaced by any information support deemed appropriate (CD-ROM, memory card, etc.).

The client comprises a storage unit 122, memorizing the client's programmes and in particular a video decompression programme.

Similarly to the server 10, the client may also comprise a temporary storage means reader such as a disk reader to co-operate with a disk.

The client 12 also comprises a calculation unit 120 which executes the programmes, a network unit 124 which undertakes receipt of the packets and a display unit 126.

As with the server, as a variant, the methods of processing the digital signal from the client's side may be stored in different storage locations. Generally speaking, an information storage means that can be read by a computer or by a microprocessor, built in or not built into the client 12, possibly removable, may memorize one or more programmes the execution of which implements the transmission method according to the present invention.

As with the server, the particular embodiment chosen for the invention may be developed, for example by adding updated or improved processing methods; in such a case, these new methods can be transmitted to the client 12 by the communication network, or loaded onto the client 12 by means of one or more disks. Clearly, the disks may be replaced by any information support deemed appropriate (CD-ROM, memory card, etc.).

Figure 2:
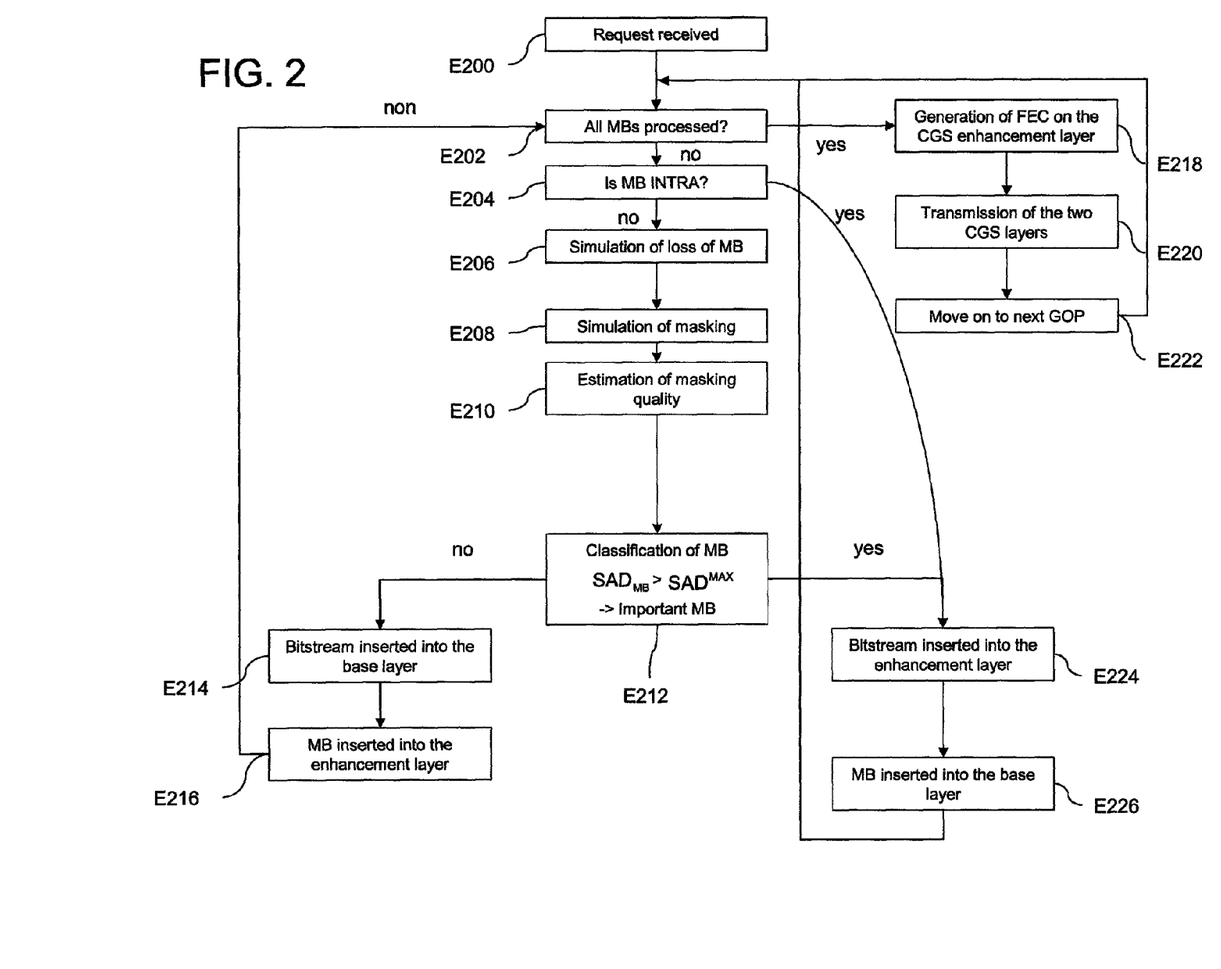
FIG. 2 is a flowchart illustrating the main steps of a transmission method according to the present invention from the server side, in one particular embodiment.
Figure 3:
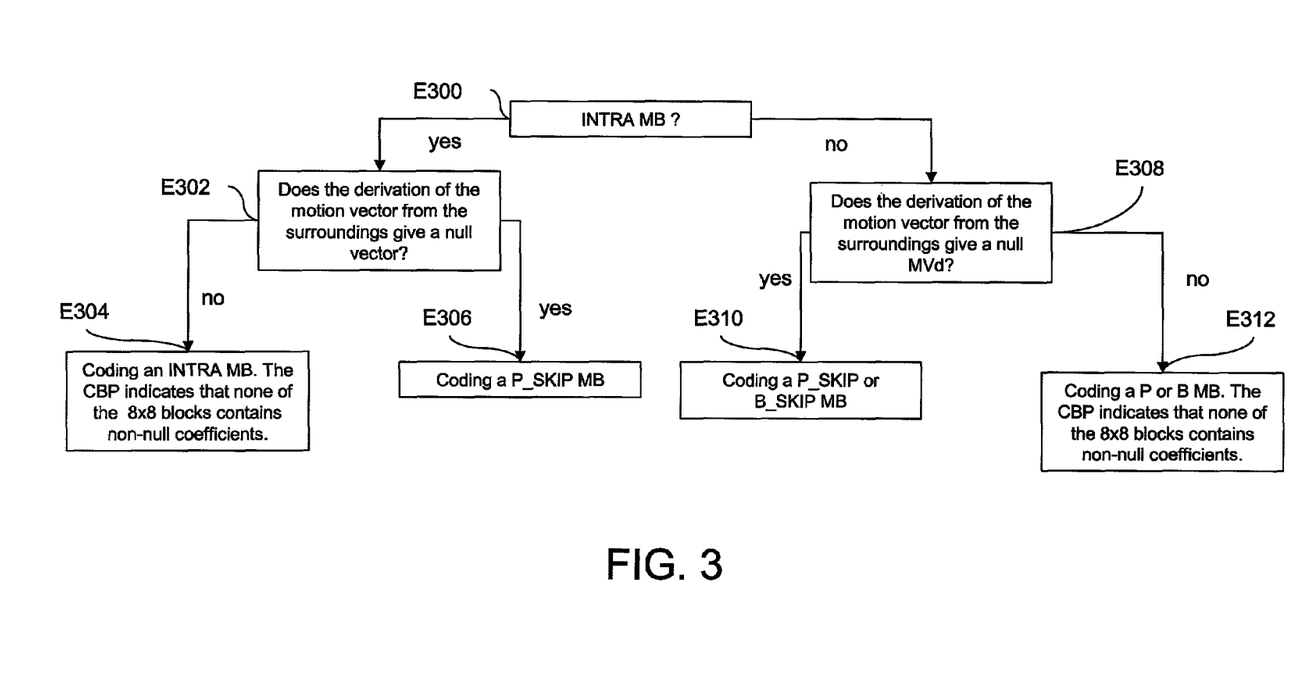
FIG. 3 is a flowchart illustrating the coding process implemented from the server side within the scope of a transmission method according to the present invention, in one particular embodiment.
Figure 4:
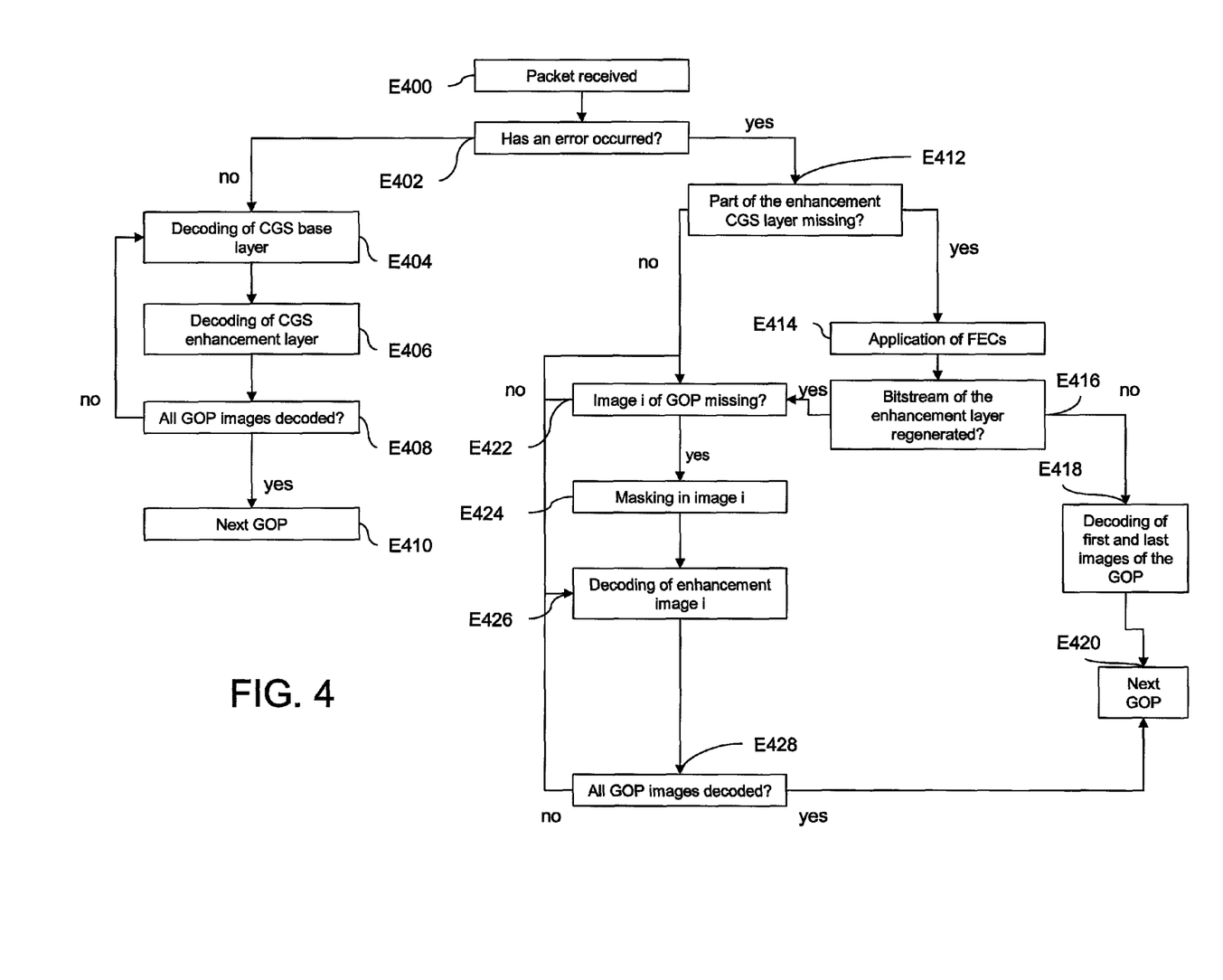
FIG. 4 is a flowchart illustrating the main steps of a transmission method according to the present invention from the client's side, in one particular embodiment.

There now follows a more detailed description of the processes performed by the server in relation to FIGS. 2 and 3 and those performed by the client in relation to FIG. 4.

It is assumed that the server memorizes H.264 or SVC videos. Each video sequence is coded by using a B-hierarchical image organisation. Consequently, the GOPs are defined as a group of images between one image I and one image P or between two images P. Nevertheless, other structures of GOPs are possible within the scope of the invention.

As the flowchart in FIG. 2 shows, at step E200, the server begins by receiving a request demanding a video sequence. This request has been made by the client.

The server retrieves the corresponding sequence in its storage unit and begins its transformation. This transformation starts by creating two CGS layers. Before issuing the sequence, the server creates a Supplemental Enhancement Information (SEI) message coded in a scalable manner to describe the sequence after transformation into two CGS layers. The SEI message is described in section G.13 of document "*Joint draft ITU-T Rec. H.264 ISO/IEC 14496-10/ Amd. 3 Scalable Video Coding*" by T. Wiegand, G. Sullivan, J. Reichel, H. Schwarz and M. Wien, 24$^{th}$ JVT meeting, Geneva, Switzerland, July 2007. Furthermore, the No_inter_ layer_pred_flag syntax element is set to zero in the NAL header of the enhancement layer to indicate that there is inter-layer prediction.

Then, the first GOP of the sequence is processed. The server first checks whether all the MBs in the GOP have been processed (step E202). If this is not the case, the server checks the type of the next remaining MB (step E204). If this is not an INTRA MB, a loss is simulated at the level of the next remaining MB (step E206).

Then, in order to simulate the processing operations carried out by the client in the event of loss, the server simulates error masking of the lost MB (step E208).

A simple way of simulating loss and error masking consists in decoding the image containing the MB, but without decoding the MB concerned, and in replacing this MB by the MB located in the same position in the closest decoded image.

As a variation, to be even closer to the processing operations actually performed by the client, it is also possible to leave the client to describe its masking algorithm to the server. The server then exactly simulates what the client does and thus has a good evaluation of the quality obtained on the client's side.

Whatever the masking method simulated by the server, it is then able to measure the difference between the masked MB and the original MB and therefore, to assess the masking quality (step E210). To do this, the server measures the Sum of Absolute Differences (SAD) between the original version and the masked version of the MB:

$$SAD_{MB} = \sum_{x=0, y=0}^{16,16} |MB^o(x, y) - MB^o(x, y)|$$

where $MB^o(x,y)$ is the pixel of the original version of the MB located in position (x,y) and $MB^o(x,y)$ is the pixel of the masked MB located in position (x,y).

In order to classify the MB, the value of $SAD_{MB}$ obtained is compared to a limit value $SAD^{MAX}$, above which the MB is regarded as important. Thus, if $SAD_{MB} > SAD^{MAX}$ then the MB is regarded as important at step E212.

Specific processing is applied to INTRA MBs. Indeed, when INTRA MBs are identified at step E204 in the original bitstream, these MBs are directly regarded as important and steps E206 to E212 are not performed for these MBs.

When an MB is deemed to be important, step E212 is followed by a step E224 during which the bitstream corresponding to the important MB is inserted into the binary stream of the CGS enhancement layer and the bitstream of the MB is modified by inserting a flag base_mode_flag having a value zero as well as a flag residual_prediction_flag also having a value zero.

Then at step E226, an MB corresponding to the same position is inserted into the base CGS layer. The aim of this processing is to guarantee that the CGS base layer complies with the standard and that the predictive coding of the motion vectors is maintained in the base layer.

A simple separation of the binary stream into two CGS layers will not provide a standard SVC binary stream. The coding of this MB depends on the type of original MB. The coding process is illustrated in FIG. 3.

The type of the original MB is first identified. If, at step E300, the MB is identified as being an INTRA MB, a check is made to determine whether the derivation of the motion vector of the current MB from the surrounding coded MBs has resulted in a null vector (step E302). The derivation process allowing the current motion vector to be predicted from the motion vectors of the surrounding MBs is described in Section 8.4.1.1 of the above-mentioned document "*Joint draft ITU-T Rec. H.264 ISO/IEC 14496-10/Amd. 3 Scalable Video Coding*".

If such is the case, the MB is coded like a P_SKIP type MB (step E306) and no additional data is coded for this MB. If this is not the case, the MB is coded like an INTRA MB with a coded_block_pattern parameter (indicated as CBP in the drawing) showing that none of the six 8×8 blocks contain non-null coefficients (step E304).

If, at the end of step E300, it has been determined that the MB is not of the INTRA type, step E300 is followed by step E308 during which a check is performed to determine whether the derivation of the motion vector from the surrounding coded MBs has resulted in a null difference of motion vectors (indicated as MVd in the drawing), which means that the current motion vector could be completely predicted by the surrounding MBs.

If this is the case, an MB is coded P_SKIP or B_SKIP (step E310). Otherwise, the MB is coded as a P or B MB with a coded_block_pattern parameter indicating that none of the six 8×8 blocks contains non-null coefficients (step E312). The difference of the motion vectors is coded in order to retrieve the same motion vector as in the original MB. The choice of the type of MB between B (B_SKIP respectively) or P (P_SKIP respectively) depends on the type of the original block.

If at step E212, the MB is classified as being not important, its bitstream is inserted into a basic CGS layer at step E214.

This step is followed by inserting an MB into the enhancement layer (step E216). The inserted MB is coded with a base_mode_flag parameter having a value 1 and a residual_prediction_flag parameter also having a value 1. The coded_block_pattern parameter indicates that none of the six 8×8 blocks contains non-null coefficients. Consequently, all the information concerning this MB in the CGS enhancement layer is deduced from the MB located in the same position in the CGS base layer.

Steps E226 and E216 are followed by step E202.

When all of the MBs in a GOP have been processed, step E202 is followed by step E218 which consists in applying a frame error correction (FEC) coding to the CGS enhancement layer. The FEC coding is applied at least to the MBs regarded as important, but may also be applied to other MBs. An FEC coder may for example be a Reed-Solomon coder. The redundancy level may be adapted to the network conditions and in particular to the rate of losses. If p is the rate of losses on the network expressed as a percentage and S is the size in octets of the enhancement data in this GOP, the Reed-Solomon coder can add p×S redundant octets. The rate of network losses can be calculated by the client and sent to the server by using RTCP packets.

Then, at step E220, the data is transmitted onto the network and the server starts to process the next GOP (step E222) if it exists.

The process stops when all of the GOPs have been processed.

The process carried out by the client will now be described with reference to FIG. 4.

After having issued a request to the server to receive a video sequence, the client receives the sequence in the form of network packets. In the particular embodiment described here, the video is received in the form of RTP packets.

When the client receives a packet (step E400), it tests whether losses have occurred during the transmission (step E402). This loss detection may consist in checking the serial number of the RTP packets. As these numbers are usually consecutive, if the difference between two successive numbers is more than 1, an error is detected.

It is assumed here that the client decodes the sequence by considering the GOPs of the SVC coded images sequence one by one. Consequently, at step E402, the client tests whether at least one error has occurred during the transmission of a GOP.

If no error has occurred, step E402 is followed by steps E404 and E406 which consist in decoding the CGS base layer and the CGS enhancement layer respectively. Here, the decoding of the base and enhancement layers appears as sequential. In fact, all the data corresponding to a given moment are decoded before decoding a new image. When all the images of a GOP are decoded (step E408), we return to step E402 and the next GOP is processed (step E410).

If at step E402 it is detected that an error has occurred during the transmission of the GOP, it is tested at step E412 whether this error has occurred in the CGS enhancement layer. The scalable coded SEI message transmitted by the server at the start of the sequence and the information contained in the NAL headers provide sufficient information to the client to enable it to identify in which layer the error has occurred.

If at step E412 the client determines that no error has occurred in the enhancement layer, the decoder identifies the base layer images affected by the error (step E422), performs an error masking on these images or on the erroneous part of these images (step E424) then decodes the information of the enhancement layer (step 426).

If the client determines at the next step, E428, that all the images of the GOP have been processed, it starts to process the next GOP (step E420).

If the client determines at step E412 that an error has occurred in the enhancement layer, at the next step, E414, it performs decoding with frame error correction (FEC). In the particular embodiment described here, it performs Reed-Solomon decoding.

If the client determines at the next step E416 that the Reed-Solomon decoder has managed to regenerate the missing data, it returns to step E422.

Otherwise, if, at step E416, the bitstream of the enhancement layer is not regenerated after Reed-Solomon decoding, only the first and last images of the GOP are decoded (step E418), if they are available. If they are not available, these images are masked. It is in fact necessary to regenerate these two images, because the client needs them to decode the next GOP at step E420. As regards the remaining images of the GOP, it is considered that since a part of the most important MBs is lost, it is no longer necessary to display this GOP, The processing of this GOP is then stopped at step E420 and the client starts to process the next GOP.

The particular embodiment described considers a process taking place in real time, in which a user requests a video sequence and a server directly performs the processing operations according to the invention. Nevertheless, these processing operations may also not be performed in real time, that is off-line, in which case the result would be memorized by the server. Consequently, the transformed sequence would be ready to be transmitted when requested by a client.

Moreover, in the particular embodiment described, the enhancement layer is deemed to carry the most important MBs and the base layer to carry the less important MBs. However, as a variant, the enhancement layer could carry the less important MBs and the base layer the more important MBs.

Furthermore, the invention applies here to a H.264 stream. However, it can just as easily be applied to a spatial layer of an SVC stream.

In addition, it will be noted that, if the transformation of the H.264 stream into two CGS SVC enhancement layers does not increase the binary throughput of the video sequence by very much, inserting a FEC to achieve unequal error protection (UEP) on the other hand risks increasing the binary throughput significantly. As this increase in the binary throughput would have the effect of increasing the congestion in the network, thus causing a rise in the rate of losses, a means of compensating for the increase in the binary throughput due to the FEC can be provided.

For example, the layer that carries the more important MBs in several MGS or FGS layers can be transcoded. Consequently, the binary throughput of the video data can be reduced to compensate for the introduction of FEC data, by deleting certain MGS or FGS data in an adaptive manner.

Moreover, the use of CGS scalability is not essential. In fact, the CGS layers may be replaced by spatial layers. In this case, the base spatial layer having a resolution below that of the original video sequence can carry the less important MBs and an enhancement spatial layer can carry the more important MBs. In order to retain the same process to create the layer carrying the less important MBs, the first layer may be created by transcoding the CGS layer obtained with the less important MBs into two spatial layers. The second CGS layer then becomes an enhancement CGS layer of the second spatial layer. This solution offers the advantage of providing increased coding binary throughput to the more important data, the binary throughput of the lowest resolution being reduced due to the change of resolution.

A simple transcoding technique may consist in decoding a spatial or CGS layer and re-encoding it into several MGS or FGS layers, or into two spatial layers.

In order to avoid displaying only the base layer, without the enhancement layer, the layer_out_flag syntax element located in the SEI message and corresponding to the base layer may be set to zero. Reference may be made on this subject to Section G.13.2.1 of the above-mentioned document "*Joint draft ITU-T Rec. H.264 ISO/IEC 14496-10/Amd. 3 Scalable Video Coding*".

Lastly, in the particular embodiment described, the macroblocks have been classified into two groups ("more important" and "less important") and two scalable coding levels have been created from these two groups. Nevertheless, we may equally well choose to classify the macroblocks into a larger number of groups, which would result in the creation of as many additional scalable coding levels.

What is claimed is:

1. A method for the transmission of a sequence of video images on a network between a server and a client, said sequence being coded according to a hybrid predictive coding mode and comprising a plurality of images, each image being broken down into a plurality of macroblocks of pixels, the method comprising:
   classifying said plurality of macroblocks into at least two groups of macroblocks according to a predetermined criterion;
   creating at least two scalable coding levels from said groups of macroblocks;
   completing bitstreams corresponding to said groups of macroblocks by using additional bitstream portions corresponding to missing macroblocks of said groups of macroblocks in order to obtain respective normalized bitstreams for each scalable coding level;
   applying unequal protection against transmission errors to said groups of macroblocks based on said predetermined criterion; and
   transmitting said scalable coding levels on the network,
   wherein said predetermined criterion defines an importance of a macroblock as a function of an estimation of quality obtained by the client in a case where the macroblock is lost during transmission, and
   wherein said additional bitstream portions are bitstream portions corresponding to macroblocks located in a same position as macroblocks deemed to be important, in another of said at least two scalable coding levels created from said groups of macroblocks.

2. A method according to claim 1, wherein said quality estimation uses a simulation of error masking for the lost macroblock.

3. A method according to claim 2, wherein said quality estimation involves determining the sum of the absolute values of the differences between the original version and the masked version of the lost macroblock and wherein the classification step involves comparing said sum to a predetermined limit value, above which the macroblock is deemed to be important.

4. A method according to claim 3, wherein said error protection application step consists in applying a Reed-Solomon coding at least to the macroblocks deemed to be important.

5. A method according to claim 1, further comprising coding said additional macroblocks differently depending on the type of coding of the macroblocks of said groups of macroblocks.

6. A method according to claim 5, wherein if the type of coding of a macroblock of said groups of macroblocks is INTRA, the method further comprises:
   checking whether the derivation of the motion vector of said INTRA macroblock from the surrounding coded macroblocks produces a null vector;
   if the derivation of the motion vector of said INTRA macroblock from the surrounding coded macroblocks produces a null vector, coding an additional macroblock with a P_SKIP type coding; and
   if the derivation of the motion vector of said INTRA macroblock from the surrounding coded macroblocks does not produce a null vector, coding an additional macroblock with an INTRA type coding and adding a parameter indicating the absence of a non-null coefficient.

7. A method according to claim 5, wherein if the type of coding of a macroblock of said groups of macroblocks is not INTRA, the method further comprises:

checking whether the derivation of the motion vector of said non-INTRA macroblock from the surrounding coded macroblocks produces a null difference of motion vectors;

if the derivation of the motion vector of said non-INTRA macroblock from the surrounding coded macroblocks produces a null difference of motion vectors, coding an additional macroblock with a P-SKIP or B_SKIP type coding; and if the derivation of the motion vector of said non-INTRA macroblock from the surrounding coded macroblocks does not produce a null difference of motion vectors, coding an additional macroblock with a type P or B coding and adding a parameter indicating the absence of a non-null coefficient.

8. A method according to claim 1, wherein said scalable coding complies with the SVC (Scalable Video Coding) standard.

9. A device for the transmission of a sequence of video images on a network between a server and a client, said sequence being coded according to a hybrid predictive coding mode and comprising a plurality of images, each image being broken down into a plurality of macroblocks of pixels, said device comprising:

a classification unit constructed to classify said plurality of macroblocks into at least two groups of macroblocks according to a predetermined criterion;

a creation unit constructed to create at least two scalable coding levels from said groups of macroblocks;

a completion unit constructed to complete bitstreams corresponding to said groups of macroblocks by using additional bitstream portions corresponding to missing macroblocks of said groups of macroblocks in order to obtain respective normalized bitstreams for each scalable coding level;

an error protection unit constructed to apply an unequal protection against transmission errors to said groups of macroblocks based on said predetermined criterion; and a transmission unit constructed to transmit on the network said scalable coding levels, wherein said predetermined criterion defines an importance of a macroblock as a function of an estimation of quality obtained by the client in a case where the macroblock is lost during transmission, and wherein said additional bitstream portions are bitstream portions corresponding to macroblocks located in a same position as macroblocks deemed to be important, in another of said at least two scalable coding levels created from said groups of macroblocks.

10. A device according to claim 9, comprising, for said quality estimation, a simulation unit constructed to simulate error masking for the lost macroblock.

11. A device according to claim 10, also comprising, for said quality estimation, a determination unit constructed to determine the sum of the absolute values of the differences between the original version and the masked version of the lost macroblock, wherein the classification unit is constructed to compare said sum to a predetermined limit value, above which the macroblock is deemed to be important.

12. A device according to claim 11, wherein said error protection unit is constructed to apply a Reed-Solomon coding at least to the macroblocks deemed to be important.

13. A device according to claim 9, also comprising a coding unit constructed to code said additional macroblocks differently depending on the type of coding of the macroblocks of said groups of macroblocks.

14. A device according to claim 13, wherein if the type of coding of a macroblock of said groups of macroblocks is INTRA, the device further comprises:

a checking unit constructed to check whether the derivation of the motion vector of said INTRA macroblock from the surrounding coded macroblocks produces a null vector;

if the derivation of the motion vector of said INTRA macroblock from the surrounding coded macroblocks produces a null vector, the coding unit is constructed to code an additional macroblock with a P_SKIP type coding; and if the derivation of the motion vector of said INTRA macroblock from the surrounding coded macroblocks does not produce a null vector, the coding unit is constructed to code an additional macroblock with an INTRA type coding and add a parameter indicating the absence of a non-null coefficient.

15. A device according to claim 13, wherein if the type of coding of a macroblock of said groups of macroblocks is not INTRA, the device further comprises:

a checking unit constructed to check whether the derivation of the motion vector of said non-INTRA macroblock from the surrounding coded macroblocks produces a null difference of motion vectors;

if the derivation of the motion vector of said non-INTRA macroblock from the surrounding coded macroblocks produces a null difference of motion vectors, the coding unit is constructed to code an additional macroblock with a P-SKIP or B_SKIP type coding; and if the derivation of the motion vector of said non-INTRA macroblock from the surrounding coded macroblocks does not produce a null difference of motion vectors, the coding unit is constructed to code an additional macroblock with a type P or B coding and add a parameter indicating the absence of a non-null coefficient.

16. A non-transitory computer readable medium embodying instructions which when executed cause a microprocessor to transmit a sequence of video images on a network between a server and a client, said sequence being coded according to a hybrid predictive coding mode and comprising a plurality of images, each image being broken down into a plurality of macroblocks of pixels, comprising:

classifying said plurality of macroblocks into at least two groups of macroblocks according to a predetermined criterion;

creating at least two scalable coding levels from said groups of macroblocks;

completing bitstreams corresponding to said groups of macroblocks by using additional bitstream portions corresponding to missing macroblocks of said groups of macroblocks in order to obtain respective normalized bitstreams for each scalable coding level;

applying unequal protection against transmission errors to said groups of macroblocks based on said predetermined criterion; and transmitting said scalable coding levels on the network, wherein said predetermined criterion defines an importance of a macroblock as a function of an estimation of quality obtained by the client in a case where the macroblock is lost during transmission, and wherein said additional bitstream portions are bitstream portions corresponding to macroblocks located in a same position as macroblocks deemed to be important, in another of said at least two scalable coding levels created from said groups of macroblocks.

* * * * *